(12) United States Patent
Shin et al.

(10) Patent No.: US 12,515,748 B2
(45) Date of Patent: Jan. 6, 2026

(54) STRUCTURE

(71) Applicant: HONDA MOTOR CO., LTD., Tokyo (JP)

(72) Inventors: Hirofumi Shin, Wako (JP); Tetsuya Ishikawa, Wako (JP); Takumi Kamioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 890 days.

(21) Appl. No.: 17/766,743

(22) PCT Filed: Aug. 14, 2020

(86) PCT No.: PCT/JP2020/030869
§ 371 (c)(1),
(2) Date: Apr. 6, 2022

(87) PCT Pub. No.: WO2021/070473
PCT Pub. Date: Apr. 15, 2021

(65) Prior Publication Data
US 2024/0092439 A1 Mar. 21, 2024

(30) Foreign Application Priority Data

Oct. 11, 2019 (JP) .................................. 2019-187923

(51) Int. Cl.
*B62D 57/032* (2006.01)
(52) U.S. Cl.
CPC .................................. *B62D 57/032* (2013.01)
(58) Field of Classification Search
CPC .................................................. B62D 57/032
See application file for complete search history.

(56) References Cited

U.S. PATENT DOCUMENTS 8,914,151 B2 * 12/2014 Hurst ..................... B62D 57/02
700/250
9,789,920 B2 * 10/2017 Hurst ..................... G06N 3/008
(Continued)

FOREIGN PATENT DOCUMENTS

JP 2005-177918 7/2005
JP 6311153 4/2018
(Continued)

OTHER PUBLICATIONS

Japanese Notice of Allowance for Japanese Patent Application No. 2020-098759 mailed Mar. 5, 2024.
(Continued)

*Primary Examiner* — Valentin Neacsu
*Assistant Examiner* — Michael R Stabley
(74) *Attorney, Agent, or Firm* — Amin, Turocy & Watson, LLP

(57) ABSTRACT

A structure of the present invention has a plurality of links (L) which link a lumbar side connection part (S) and a grounding part (E), and passive joints (M) which link the links (L) to each other, in which a second Jacobian matrix Jp in a coordinate system obtained by rotating a coordinate system of a first Jacobian matrix J which associates a displacement vector δp of the grounding part (E) with a micro displacement vector δθ of each of the passive joints (M) at an angle θp satisfies following Formula (1) or Formula (2) using spring constants k1 and k2 and constants C2 and C4 of a spring which controls the micro displacement δθ of two passive joints (M).

[Math. 1]
$$J_p = \begin{bmatrix} J_{p11} & \pm c_2 J_{p11} \\ J_{p21} & \mp c_4 J_{p21} \end{bmatrix} \quad (1)$$

(Continued)

-continued $$J_p = \begin{bmatrix} J_{p11} & \pm c_2 J_{p21} \\ J_{p21} & \mp c_4 J_{p11} \end{bmatrix} \quad (2)$$

6 Claims, 12 Drawing Sheets

(56) References Cited

U.S. PATENT DOCUMENTS

| | | | |
|---|---|---|---|
| 10,189,519 B2* | 1/2019 | Hurst | B62D 57/032 |
| 2004/0255711 A1* | 12/2004 | Takenaka | B25J 19/0008 |
| | | | 74/490.01 |
| 2005/0085948 A1 | 4/2005 | Herr et al. | |
| 2005/0194194 A1 | 9/2005 | Delson | |
| 2013/0013111 A1 | 1/2013 | Hurst et al. | |
| 2013/0226048 A1* | 8/2013 | Unluhisarcikli | A61H 1/0244 |
| | | | 601/34 |
| 2016/0288848 A1 | 10/2016 | Hurst et al. | |
| 2016/0347387 A1 | 12/2016 | Hurst et al. | |

FOREIGN PATENT DOCUMENTS

| | | |
|---|---|---|
| JP | 7200181 | 1/2023 |
| WO | 2019/162144 | 8/2019 |

OTHER PUBLICATIONS

Fukui Takahiro, et, al., "Autonomous gait transition of a quadruped robot based on vestibular sensation", Proceedings of 33rd Annual Conference of the Robotics Society of Japan DVD-ROM 2015, Japan, The Robotics Society of Japan, Sep. 3, 2015.
International Search Report and Written Opinion for International Application No. PCT/JP2020/030869 mailed on Nov. 2, 2020, 10 pages.
Kenji Kaneko, et al., IEEE/RSJ International Conference on Intelligent Robots and Systems, 3 (2002) 2431-2436.
Sebastian Lohmeier, et al., 2009 IEEE International Conference on Robotics and Automation, 775-780, 2009.
Marc H Raibert, Legged Robots That Balance, MIT press, 1986.
Xiaobin Xiong, et al., 2018 IEEE/RSJ International Conference on Intelligent Robots and Systems (IROS), 3821-3828, 2018.
Christian Hubicki, et al., The International Journal of Robotics Research, 35 (2016) 1497-1521.
Rezazadeh et al., Robot Leg Desigh: A Constructive Framework, IEEE Access, 2018.
Japanese Office Action for Japanese Patent Application No. 2020-098759 mailed Aug. 15, 2023.

* cited by examiner (a)

(b)

STRUCTURE

TECHNICAL FIELD

The present invention relates to a leg structure for bipedal walking.

Priority is claimed on Japanese Patent Application No. 2019-187923, filed Oct. 11, 2019, the content of which is incorporated herein by reference.

BACKGROUND ART

Research on bipedal walking robots that are applicable to various environments has attracted attention over the decades. In general, the legs of bipedal walking robots apply a simplified model such as a spring-type inverted pendulum (SLIP) and have a multi-link structure made up of a plurality of links (Non-Patent Literature 1 and 2). Complex dynamics of the legs are realized by adjusting the movement of each link using a controller (Patent Literature 1). As the bipedal walking robots to which the SLIP model is applied, structures such as a Cassie having a serial link type structure, a Pogo-stick-like Robot (Non-Patent Literature 3 and 4), an ATRIAS having a parallel link type structure (Non-Patent Literature 5) have been developed.

CITATION LIST

Patent Literature

[Patent Literature 1]
Japanese Patent No. 6311153

Non-Patent Literature

[Non-Patent Literature 1]
Kenji Kaneko, et al., IEEE/RSJ International Conference on Intelligent Robots and Systems, 3 (2002) 2431-2436
[Non-Patent Literature 2]
Sebastian Lohmeier, et al., 2009 IEEE International Conference on Robotics and Automation, 775-780
[Non-Patent Literature 3]
Marc H Raibert, MIT press, 1986
[Non-Patent Literature 4]
Xiaobin Xiong, et al., 2018 IEEE/RSJ International Conference on Intelligent Robots and Systems (IROS), 3821-3828
[Non-Patent Literature 5]
Christian Hubicki, et al., The International Journal of Robotics Research, 35 (2016) 1497-1521

SUMMARY OF INVENTION

Technical Problem

Because the serial link type structure is driven by one motor, it is small and suitable for use in a narrow space, but the driving force is low and it is difficult to perform bipedal walking. Because the parallel link type structure is driven by two motors, it has a high driving force and is suitable for performing bipedal walking, but it is difficult to use in a narrow space. Further, because each structure is also made up of a large number of members and each member has parameters such as a predetermined length and angle, it is difficult to design and obtain an optimum configuration.

The present invention has been made in view of the above circumstances, and an object of the present invention is to provide a leg structure for bipedal walking, which has dynamics like a linear motion spring used in a SLIP model.

Solution to Problem

In order to solve the above problems, the present invention adopts the following means.

(1) A structure according to an aspect of the present invention is a structure of a leg having a movement mechanism which includes a plurality of links which link a lumbar side connection part connected to a lumbar part and a grounding part E coming into contact with a ground to be walked on, and passive joints which link the two adjacent links, in which a first Jacobian matrix J satisfies the following Formula (1) using a displacement vector $\delta p$ of the grounding part and a micro displacement vector $\delta \theta$ of each of the passive joints, an angle $\theta p$ is formed by the links and a straight line passing through the lumbar side connection part and orthogonal to the ground, a second Jacobian matrix Jp in a coordinate system obtained by rotating a coordinate system of the first Jacobian matrix J at the angle $\theta p$, and the second Jacobian matrix Jp satisfy the following Formula (2) using spring constants k1 and k2 and constants C2 and C4 of a spring which controls the micro displacement $\delta \theta$ of the two passive joints, and satisfy the following Formula (3) or the following Formula (4) using the constants C2 and C4.

(2) The structure according to above (1), a part of the plurality of the links may form the five-node link mechanism, the part of the plurality of the links may consist of first passive joints O and A to which a motor having a spring is attached, second passive joints B, C and D to which the motor is not attached, the grounding part E, a link OA which connects the first passive joint O and the first passive joint A, a link AB which connects the first passive joint A and the second passive joint B, a link BC which connects the second passive joint B and the second passive joint C, a link CD which connects the second passive joint C and the second passive joint D, a link CE which connects the second passive joint C and the grounding part E, a link DE which connects the second passive joint D and the grounding part E, and a link DO which connects the second passive joint D and the first passive joint O.

(3) In the structure according to any one of above (1) or (2), it is preferable that a length of the link DE be equal to a length of the link DO.

(4) In the structure according to any one of above (1) to (3), it is preferable that the first passive joint O and the first passive joint A overlap, and a length of a line segment AD which connects the first passive joint A and the second passive joint D be equal to a length of the link DO.

(5) In the structure according to any one of above (1) to (4), it is preferable that the length of the line segment AD be fixed, the length of the link CD be equal to the length of the link AB, and the length of the line segment AD be equal to the length of the link BC.

(6) In the structure according to any one of (1) to (5), it is preferable that the length of the line segment AD be fixed, the length of the link CD be equal to the length of the link BC, and the length of the line segment AD be equal to the length of the link AB.

(7) In the structure according to any one of above (1) to (6), the link CD, the link CE, and the link DE may be integrated.

Advantageous Effects of Invention

The structure of the present invention is defined by the conditional expression for establishing the dynamics of the linear motion spring of the SLIP model, which is derived on the premise that when a force acts in a direction that connects the grounding part (foot part) and a lumbar side connection part, the reaction force returns in the same direction. The conditional expression gives constraint conditions having the same statics as the dynamics of the linear motion spring of the SLIP model. Therefore, by applying the conditional expression, it is possible to verify whether the dynamics of the SLIP model are established in various structures constituting the legs. Further, by satisfying the constraint conditions to, in turn, satisfy the conditional expression, it is possible to efficiently realize a leg structure for bipedal walking having the dynamics of the linear motion spring of the SLIP model, without repeating the trial and error design as in the conventional research.

The structure of the present invention constitutes the leg having the dynamics of the linear motion spring of the SLIP model by adopting a spring suitable for each design parameter of the five-node link, and can realize the movement of the leg that generates a force for expanding and contracting between the lumbar side portion and the heel side portion. Further, the structure of the present embodiment is a parallel link type including the springs that are in series with each of the two motors, has a high driving force, and can be miniaturized. In many cases, although the design of the required spring is complicated, the structure of the present embodiment can simplify the design of the two springs required to realize the linear motion spring, by making the closed link mechanism constituting the femoral portion a parallel link mechanism, and making the length of the femoral portion equal to the length of the shin portion.

In the structure of the present invention, when the length of the link DE and the length of the link DO are equal, the spring design work required to realize a predetermined operation can be simplified.

Further, in the structure of the present invention, even when the motor O and the motor A overlap, and the length of the line segment AD that connects the motor A and the passive joint D is equal to the length of the link DO, the required spring design work can be simplified.

Further, in the structure of the present invention, even when the length of the line segment AD is fixed, the length of the link CD and the length of the link AB are equal to each other, and the length of the line segment AD and the length of the link BC are equal to each other, the required spring design work can be simplified.

Further, in the structure of the present invention, even when the length of the line segment AD is fixed, the length of the link CD and the length of the link BC are equal to each other, and the length of the line segment AD and the length of the link AB are equal to each other, the required spring design work can be simplified.

BRIEF DESCRIPTION OF DRAWINGS

FIG. 12(b) is a graph which shows the force acting on the grounding part when a structure of an example is operated.

DESCRIPTION OF EMBODIMENTS

Figure 1:
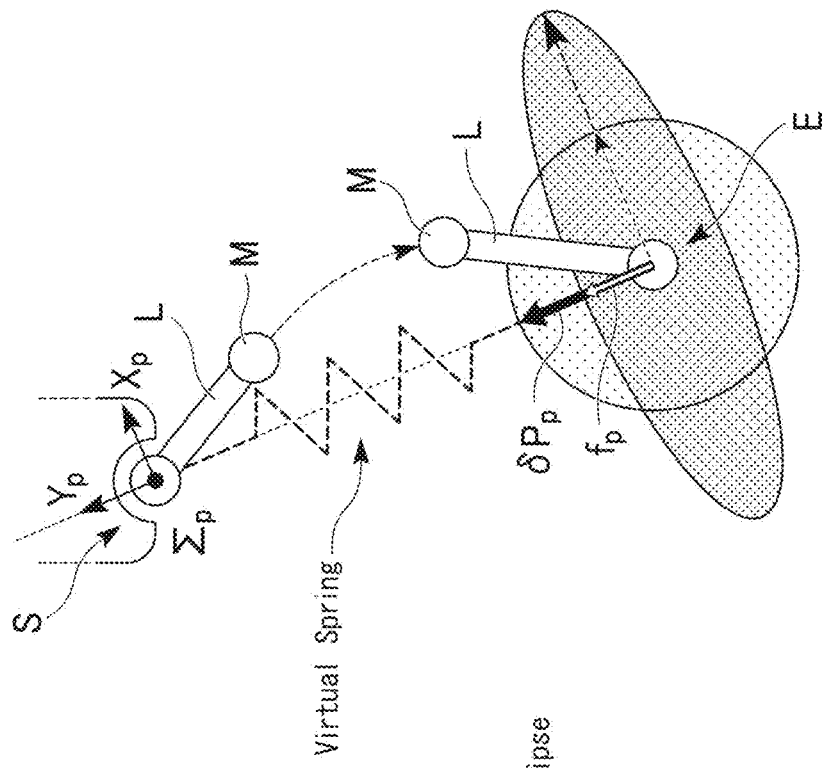
FIG. 1 is a diagram showing a design method of a leg structure (100) having a movement mechanism according to an embodiment of the present invention.
Figure 1:
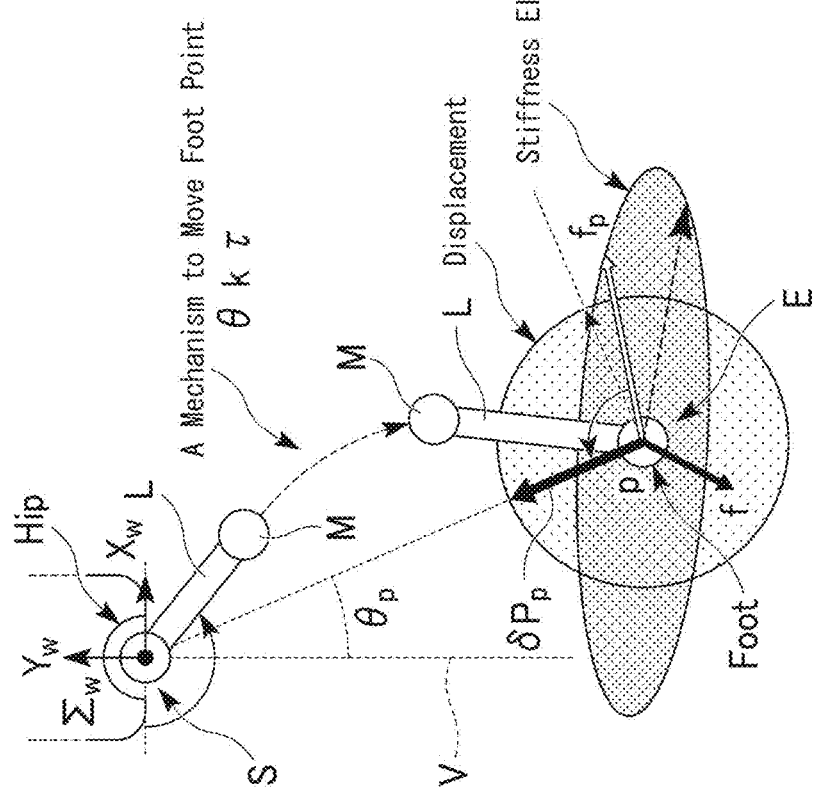

Hereinafter, a structure according to an embodiment to which the present invention is applied and a design method thereof will be described in detail with reference to the drawings. In addition, in the drawings used in the following explanation, in order to make the features easy to understand, the featured parts may be enlarged for convenience, and the dimensional ratios of each component and the like are not the same as the actual ones. Further, the materials, dimensions, and the like exemplified in the following description are examples, and the present invention is not limited thereto, and the present invention can be appropriately modified within a scope that does not change the gist thereof.

Embodiment

FIG. 1 is a diagram showing a design method of a leg structure 100 having a movement mechanism according to an embodiment of the present invention. The structure 100 has a plurality of links L that connect a lumbar side connection part S connected to a lumbar part and a grounding part (foot portion) E that comes into contact with the ground to be walked upon, and a passive joint M that connects two adjacent links L to each other.

The position of the grounding part E is defined as p, and the displacement vector there is defined as δp. The state (position, rotation angle, etc.) of the passive joint M is defined as θ, and the micro displacement vector thereof is defined as δθ. Here, among all the links L (L1, L2, ... Ln) connected via the respective passive joints M (M1, M2, ... Mn), an angle formed by pairs (L1 and L2, L2 and L3, ... Ln−1 and Ln) of the adjacent links is defined as θ (θ12, θ23, ..., θn−1, n), and a micro displacement vector thereof is defined as δ (n is an integer). At this time, a relationship between the micro displacement vectors δp and δθ can be expressed by the following Formula (1) using a first Jacobian matrix J.

[Math. 1]
$$\delta p = J \delta \theta \quad (1)$$

Here, when a torque due to the rotation of the link L in a θ direction is defined as τ, and a vector of the force (a contact force) acting on the grounding part E is defined as f, τ and f satisfy a relationship of the following Formula (2).

[Math. 2]
$$\tau = J^T f \quad (2)$$

Further, the torque T satisfies a relationship of the following Formula (3) using the spring constant K so that a structure between the lumbar side connection part S and the grounding part E is modeled by a series elastic actuator.

[Math. 3]
$$\tau = K \delta \theta \quad (3)$$

From the above Formulas (1) to (3), the following Formula (4) can be obtained.

[Math. 4]
$$\delta p = J K^{-1} J^T f \quad (4)$$

An angle formed between the link L and a straight line V passing through the lumbar side connection part S and orthogonal to the ground is defined as θp. A second Jacobian matrix in a coordinate system ΣP obtained by rotating a coordinate system ΣW of a first Jacobian matrix J by the angle θp is defined as Jp. At this time, the second Jacobian matrix Jp can be expressed by the following Formula (5). Further, a stiffness vector Sp of the grounding part E described in the coordinate system ΣP can be expressed by the following Formula (6).

[Math. 5]
$$J_p = \begin{bmatrix} \cos\theta_p & \sin\theta_p \\ -\sin\theta_p & \cos\theta_p \end{bmatrix} J \quad (5)$$

[Math. 6]
$$S_p = J_p^{-T} K J_p^{-1} \quad (6)$$

Among the plurality of passive joints M constituting the structure 100, the spring constants of the springs that control the micro displacements δθ (δθ1, δθ2) of the two passive joints M1 and M2 are defined as k1 and k2, respectively.

When the spring constant K of the structure 100 is expressed by diag (k1, k2) and the second Jacobian matrix Jp is expressed by [{Jp11, Jp12}T, {Jp11, Jp12}T]T, the stiffness vector Sp can be expressed by the following Formula (7) from the above Formulas (5) and (6).

[Math. 7]
$$S_p = \frac{-1}{|J_p|^2} \begin{bmatrix} -J_{p21}^2 k_2 - J_{p22}^2 k_1 & J_{p11} J_{p21} k_2 + J_{p12} J_{p22} k_1 \\ J_{p11} J_{p21} k_2 + J_{p12} J_{p22} k_1 & -J_{p21}^2 k_2 - J_{p22}^2 k_1 \end{bmatrix} \quad (7)$$

In the dynamics of the linear motion spring of the SLIP model, when a force acts in the direction connecting the grounding part E and the lumbar side connection part S, the reaction force fp acts in the same direction no matter where the position of the grounding part E is.

Therefore, a displacement vector δpp of the grounding part E is expressed by the following Formula (8) using a positive constant, and the vector product of the displacement vector δpp and the reaction force fp is expressed by the following Formula (9).

[Math. 8]
$$\delta p_p = \{0, \alpha\}^T \quad (8)$$

[Math. 9]
$$f_p \times \delta p_p = S_p \delta p_p \times \delta p_p = 0 \quad (9)$$

Further, from the above Formulas (7) to (9), the following Formula (10) can be obtained.

[Math. 10]
$$J_{p11} J_{p12} k_2 + J_{p12} J_{p22} k_1 = 0 \quad (10)$$

Since the stiffness matrix Sp is a diagonal matrix by the above Formula (10), the spring constant K in the structure can be expressed by the following Formula (11) for a component Kvpara parallel to and a component Kvperp perpendicular to the displacement direction of the grounding part E, from the diagonal component of stiffness matrix Sp.

[Math. 11]
$$k_{vpara} = \frac{J_{p21}^2 k_2 + J_{p22}^2 k_1}{|J_p|^2}, \quad k_{vperp} = \frac{J_{p11}^2 k_2 + J_{p12}^2 k_1}{|J_p|^2} \quad (11)$$

Further, when Jp12Jp22≠0 or Jp11Jp21≠0 by the above Formula (10), the relationship of the following Formula (12) is established. In the case of Jp12Jp22=0 or Jp11Jp21=0, the spring constants k1 and k2 are both 0, and the position of the grounding part E cannot be controlled by the angle θ.

[Math. 12]
$$\frac{k_1}{k_2} = -\frac{J_{p11} J_{p21}}{J_{p12} J_{p22}} \quad (12)$$

If the above Formula (12) is satisfied, although the dynamics of the linear motion spring of the SLIP model will be realized, there is a need for a complicated mechanism that changes the spring constant depending on the angle. In order to realize dynamics of the linear motion spring the SLIP model without such a mechanism, k1/k2 is assumed to be a constant. Specifically, it is assumed that the spring constants k1 and k2 satisfy the relationship of k2=C2C4k1 using the constants C2 and C4. Then, the following Formula (13) or the following Formula (14) using the second Jacobian matrix Jp and the constants C2 and C4 is assumed to be satisfied.

[Math. 13]

$$J_p = \begin{bmatrix} J_{p11} & \pm c_2 J_{p11} \\ J_{p21} & \mp c_4 J_{p21} \end{bmatrix} \quad (13)$$

[Math. 14]

$$J_p = \begin{bmatrix} J_{p11} & \pm c_2 J_{p21} \\ J_{p21} & \mp c_4 J_{p11} \end{bmatrix} \quad (14)$$

The above Formulas (13) and (14) derived on the premise that the force fp acts on the grounding part E in the same direction as the displacement of the grounding part E become conditional expressions because the dynamics of the linear motion spring of the SLIP model is established. These conditional expressions give constraint conditions having the dynamics of the linear motion spring of the SLIP model. Therefore, by applying these conditional expressions, it is possible to verify whether the dynamics of the linear motion spring of the SLIP model are established for the various structures constituting the legs. Further, by designing to satisfy the constraint conditions to satisfy these conditional expressions, it is possible to efficiently realize a structure of the leg having the dynamics of the linear motion spring of the SLIP model, without repeating the trial and error design as in the conventional research.

Various structures that make up the legs are listed, and it is verified whether dynamics of the linear motion spring of the SLIP model are established, using Formulas (13) and (14).

Application Example 1

Figure 2:
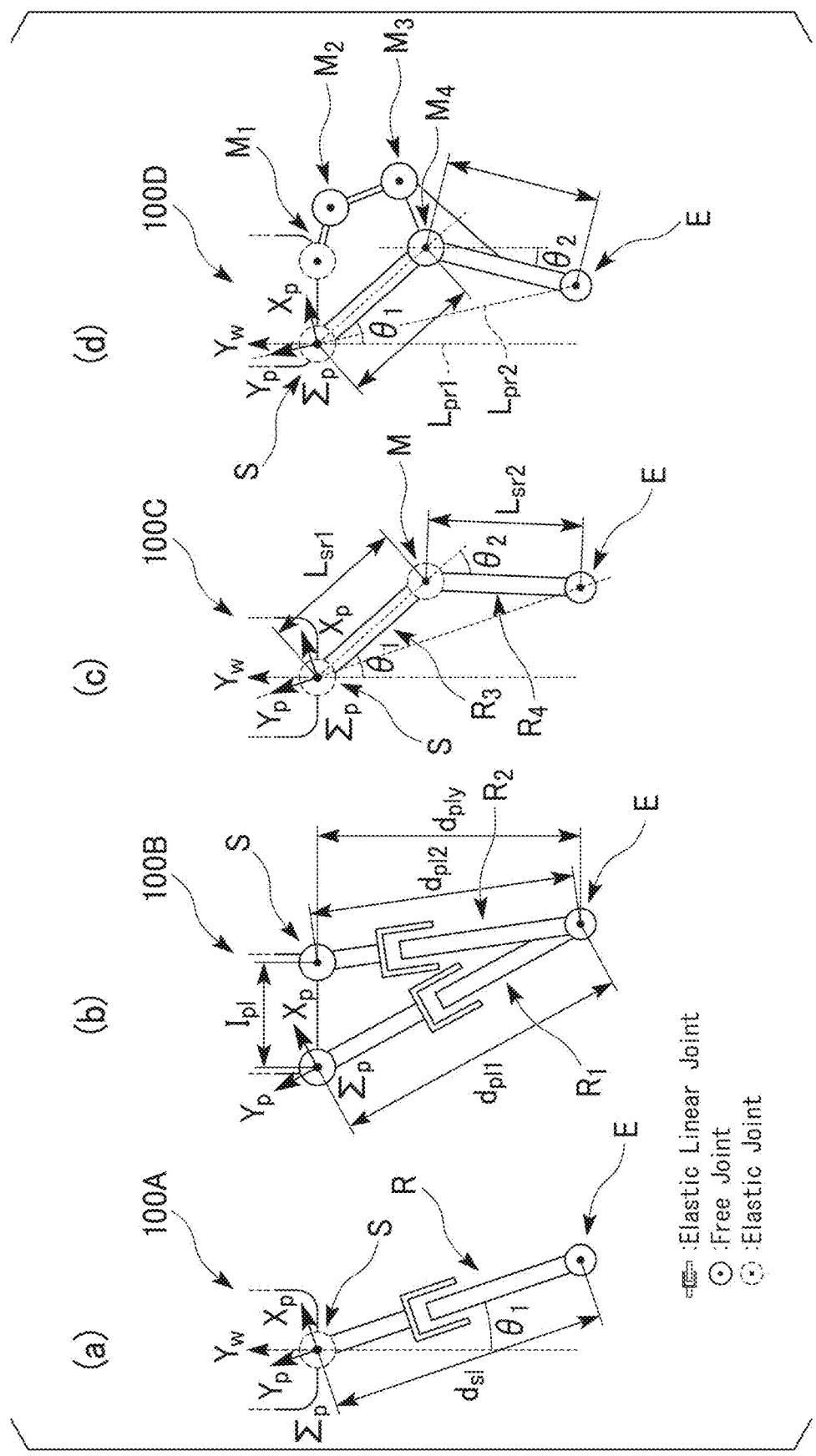
FIGS. 2(a) to 2(d) are diagrams for explaining various structures constituting the legs.

FIG. 2(a) is a diagram of a serial link type structure 100A. The structure 100A has one rotor (oscillator) R that can expand and contract in a straight line and can rotate around the lumbar side connection part S. When a length of a rotor R that connects the lumbar side connection part S to the grounding part E is defined as dsl, the second Jacobian matrix Jp(a) here is expressed by the following Formula (15). The Formula (15) is a diagonal matrix, and diagonal components and off-diagonal components have a relationship of a constant multiplication with each other, and satisfy the relationship of the above Formula (14). From this, it is understood that the dynamics of the linear motion spring of the SLIP model is established for the structure 100A.

[Math. 15]

$$J_{p(a)} = \begin{bmatrix} d_{sl} & 0 \\ 0 & -1 \end{bmatrix} \quad (15)$$

Application Example 2

FIG. 2(b) is a diagram of a parallel link type structure 100B. The structure 100B has two rotors R1 and R2 that can be expanded and contracted in a straight line and can rotate around the lumbar side connection part S. When the lengths of the rotors R1 and R2 that connect from the lumbar side connection part S to the grounding part E are defined as dpl1 and dpl2, respectively, the second Jacobian matrix Jp(b) here is expressed by the following Formula (16) and (17). In the case of dpl1=dpl2, the Formula (16) satisfies the relationship of the above Formula (13). However, in the case of dpl1=dpl2, the Formula (16) does not satisfy any of the relationships of the above Formulas (13) and (14). Accordingly, it is understood that the dynamics of the linear motion spring of the SLIP model are not established for the structure 100B.

[Math. 16]

$$J_{p(b)} = \begin{bmatrix} \dfrac{d_{pl1}}{l_{pl}} & -\dfrac{d_{pl2}}{l_{pl}} \\ -\dfrac{l_{pl}^2 - (d_{pl1}^2 - d_{pl2}^2)}{2l_{pl}^2} \dfrac{d_{pl1}}{p_{ply}} & -\dfrac{l_{pl}^2 + (d_{pl1}^2 - d_{pl2}^2)}{2l_{pl}^2} \dfrac{d_{pl2}}{p_{ply}} \end{bmatrix} \quad (16)$$

[Math. 17]

$$p_{ply} = \pm \dfrac{1}{2l_{pl}} \sqrt{4l_{pl}^2 d_{pl1}^2 - (l_{pl}^2 + d_{pl1}^2 - d_{pl2}^2)^2} \quad (17)$$

Application Example 3

FIG. 2(c) is a diagram of a serial link type structure 100C. The structure 100C has two rotors R3 and R4 connected by a passive joint M. The rotors R3 and R4 enable rotation around the lumbar side connection part S and the passive joint M, respectively. Assuming that Lsr1=Lsr2=L, the second Jacobian matrix Jp(c) is expressed by the following Formula (18). Since the Formula (18) does not satisfy any of the relations of the Formulas (13) and (14), it is understood that the dynamics of the linear motion spring of the SLIP model are not established for the structure 100C.

[Math. 18]

$$J_{p(c)} = \begin{bmatrix} 2l\cos\dfrac{1}{2}\theta_2 & -l\cos\dfrac{1}{2}\theta_2 \\ 0 & l\sin\dfrac{1}{2}\theta_2 \end{bmatrix} \quad (18)$$

Application Example 4

FIG. 2(d) is a diagram of a parallel link type structure 100D. The structure 100D has a five-node link mechanism in which links connected by passive joints M1, M2, M3, and M4 are further connected to the structure 100C of Application Example 3. The passive joint M1 plays the same role as the lumbar side connection part S. Assuming that Lpr1=Lpr2=L, the second Jacobian matrix Jp(d) is expressed by the following Formula (19). In the Formula (19), the components belonging to the same row have a relationship of the constant multiplication with each other, and satisfy the relationship of the above Formula (13). It is understood from this that the dynamics of the linear motion spring of the SLIP model are established for the structure 100D.

[Math. 19]

$$J_{p(d)} = \begin{bmatrix} l\cos\left(\frac{1}{2}\theta_2 - \frac{1}{2}\theta_1\right) & -l\cos\left(\frac{1}{2}\theta_2 - \frac{1}{2}\theta_1\right) \\ l\sin\left(\frac{1}{2}\theta_2 - \frac{1}{2}\theta_1\right) & l\sin\left(\frac{1}{2}\theta_2 - \frac{1}{2}\theta_1\right) \end{bmatrix} \quad (19)$$

Application Example 4-1

Figure 3:
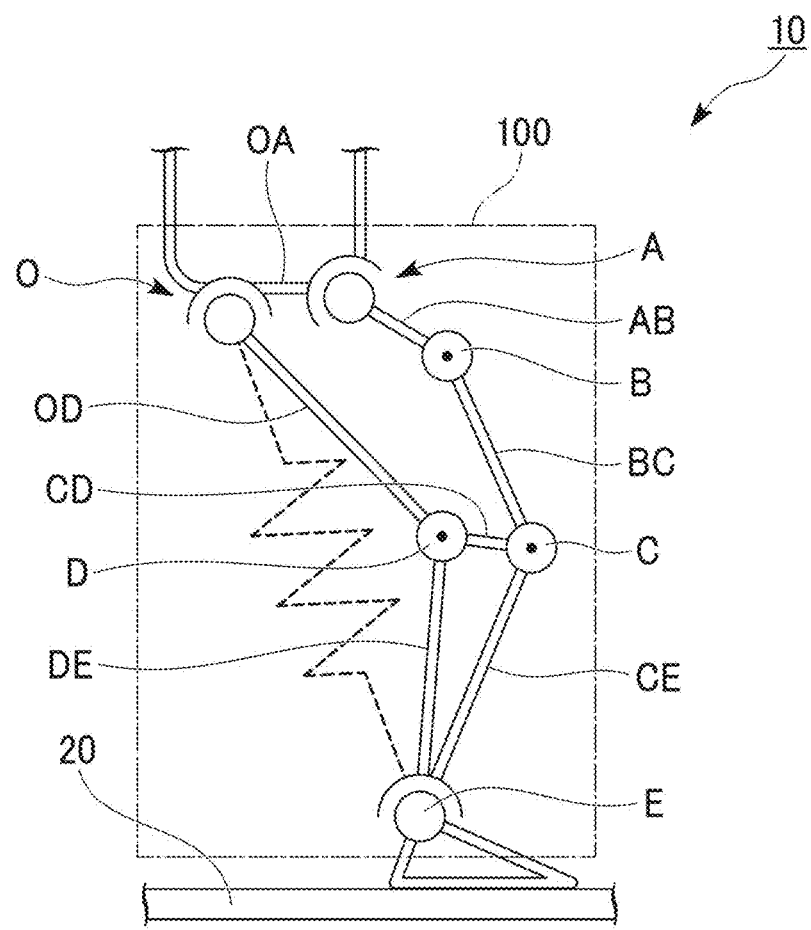
FIG. 3 is a plan view of a leg according to the first embodiment of the present invention.
Figure 4:
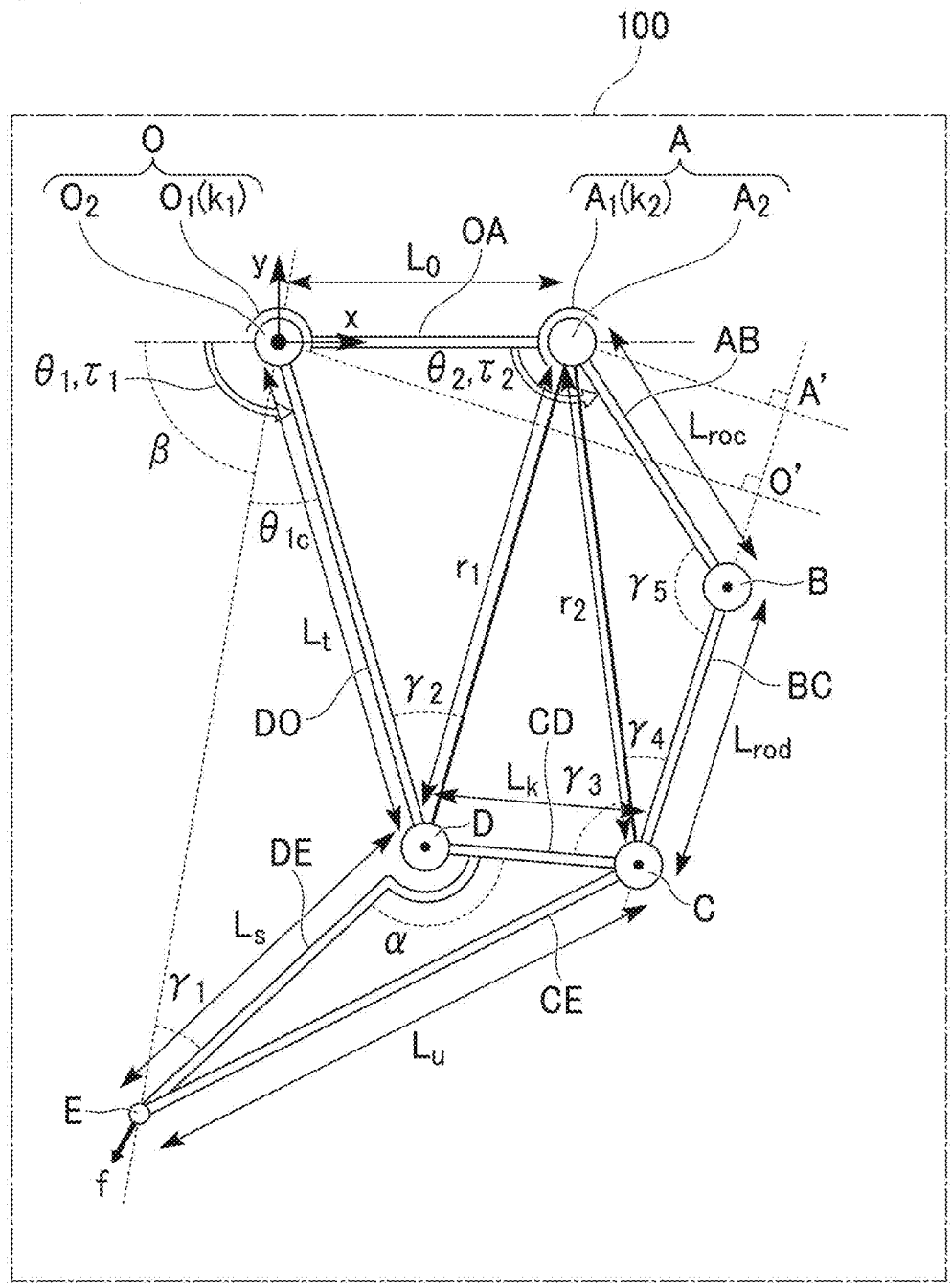
FIG. 4 is an enlarged view of the structure constituting the leg of FIG. 3.

FIG. 3 is a plan view of the leg 10 for bipedal walking shown as Application Example 4-1 of the design method of the structure according to the above embodiment, and shows a state in which the leg 10 is erected on a flat ground 20. FIG. 4 is an enlarged view of a structure (leg body) 100 that constitutes the leg 10 of FIG. 3 and has a movement mechanism.

The structure 100 of the leg has a five-node link mechanism that includes a first passive joint O to which a motor having a spring O1 is attached, a first passive joint A to which a motor having a spring A1 is attached, second passive joints B, C and D to which a motor is not attached, a grounding part E, and links OA, AB, BC, CD, CE, DE, and DO. A link OA connects the first passive joint O and the first passive joint A. A link AB connects the first passive joint A and the second passive joint B. A link BC connects the second passive joint B and the second passive joint C. A link CD connects the second passive joint C and the second passive joint D. A link CE connects the second passive joint C and the grounding part E. A link DE connects the second passive joint D and the grounding part E. CDE constitutes one rigid body link. The second passive joint D and the link DO connect the first passive joint O. The link CD portion corresponds to a knee portion, a portion between the link CD and the link AB corresponds to a femoral portion, and a portion between the link CD and the grounding part E corresponds to a cruris portion.

The spring O1 has a spring constant k1 and is disposed to expand and contract along the circumference of a core portion O2 of the first passive joint O, and is configured to rotate the core portion O2 with expansion and contraction. Similarly, the spring A1 has a spring constant k2, is disposed to expand and contract along the circumference of the core portion A2 of the first passive joint A and is configured to rotate the core portion A2 with expansion and contraction.

Lengths of the links OA, AB, BC, CD, CE, DE, and DO are defined as Lo, Lroc, Lrod, Lk, Lu, Ls, and Lt, respectively. The angle (∠DOE) formed by the link DO and the line segment OE is defined as θ1c, and the angle (∠OAB) formed by the link OA and the link AB is defined as θ2. When the first passive joint O is rotated by an angle θ1c after fixing the link OA, a torque τ1 generated by the spring O1 that expands and contracts is expressed by k1Δθ1c. Similarly, when the first passive joint A is rotated by an angle θ2, a torque τ2 generated by the spring A1 that expands and contracts is expressed by k2Δθ2. Therefore, a ratio (k1/k2) of the spring constants of the two springs O1 and A1 is given by the following Formula (20).

[Math. 20]

$$\frac{k_1}{k_2} = \left|\frac{\tau_1}{\tau_2}\frac{dO_2}{d\theta_{1c}}\right| \quad (20)$$

A point on which a perpendicular line drawn from the first passive joint O intersects the straight line obtained by extending the link BC is defined as O', and a point on which the perpendicular line drawn from the first passive joint A intersects the straight line is defined as A'. A force f1v acting on the grounding part E in a direction perpendicular to the line segment OE due to the torque τ1 is τ1/|OE|. Further, a force f2v acting on the grounding part E in the direction perpendicular to the line segment OE due to the torque τ2 is (τ2|OO'|)/(|AA'||OE|). Because the reaction force of the spring needs to be generated only in the OE direction to realize the direction of the force of the linear motion spring of the SLIP model, when f1v=f2v, the ratio (τ1/τ2) of the torques due to the two springs O1 and A1 is given by the following Formula (21).

[Math. 21]

$$\frac{\tau_1}{\tau_2} = \frac{|OO'|}{|AA'|} \quad (21)$$

The straight line passing through the first passive joint O and the first passive joint A is defined as a straight line OA, the straight line passing through the first passive joint O and the passive joint D is defined as a straight line DO, and the straight line passing through the first passive joint O and the grounding part E is defined as a straight line OE. Further, the straight line passing through the first passive joint A and the passive joint C is defined as a straight line AC, and the straight line passing through the first passive joint A and the passive joint D is defined as a straight line AD. Further, the angle formed by the link DE and the straight line OE is defined as γ1, the angle formed by the straight line DO and the straight line AD is defined as γ2, the angle formed by the straight line AC and the link CD is defined as γ3, the angle formed by the straight line AC and the link BC is defined as γ4, and an angle formed by the link AB and the link BC is defined as γ5. At this time, the angle θ2 formed by the link OA and the link OB is given by the following Formula (22).

[Math. 22]

$$\theta_2 = \pi + \alpha + \beta - \gamma_1 - \gamma_3 - \gamma_4 - \gamma_5 \quad (22)$$

By differentiating both sides of the above Formula (22) with θ1c, the following Formula (23) is obtained.

[Math. 23]

$$\frac{d\theta_2}{d\theta_{1c}} = -d\frac{d\gamma_1}{d\theta_{1c}} - \frac{\partial\gamma_3}{\partial r_1}\frac{dr_1}{d\theta_{1c}} - \left(\frac{\partial\gamma_3}{\partial r_2} + \frac{\partial\gamma_4}{\partial r_2} + \frac{\partial\gamma_5}{\partial r_2}\right)\frac{dr_2}{d\theta_{1c}} \quad (23)$$

Here, first, second, and third terms on the right side of the above Formula (23) are given by the following Formulas (24) to (26), respectively.

[Math. 24]

$$\frac{d\gamma_1}{d\theta_{1c}} = \frac{l_t \cos\theta_{1c}}{\sqrt{l_s^2 - l_t^2 \sin^2\theta_{1c}}} \quad (24)$$

[Math. 25]

$$\frac{\partial\gamma_3}{\partial r_1}\frac{dr_1}{d\theta_{1c}} = \frac{2r_1}{\sqrt{-m}}\frac{dr_1}{d\theta_{1c}} \quad (25)$$

-continued

[Math. 26]

$$\left(\frac{\partial \gamma_3}{\partial r_2} + \frac{\partial \gamma_4}{\partial r_2} + \frac{\partial \gamma_5}{\partial r_2}\right)\frac{dr_2}{d\theta_{1c}} = \left(\frac{l_k^2 - r_1^2 - r_2^2}{r_2\sqrt{-m}} + \frac{l_{rod}^2 - l_{roc}^2 + r_2^2}{r_2\sqrt{-n}}\right)\frac{dr_2}{d\theta_{1c}} \quad (26)$$

Figure 5:
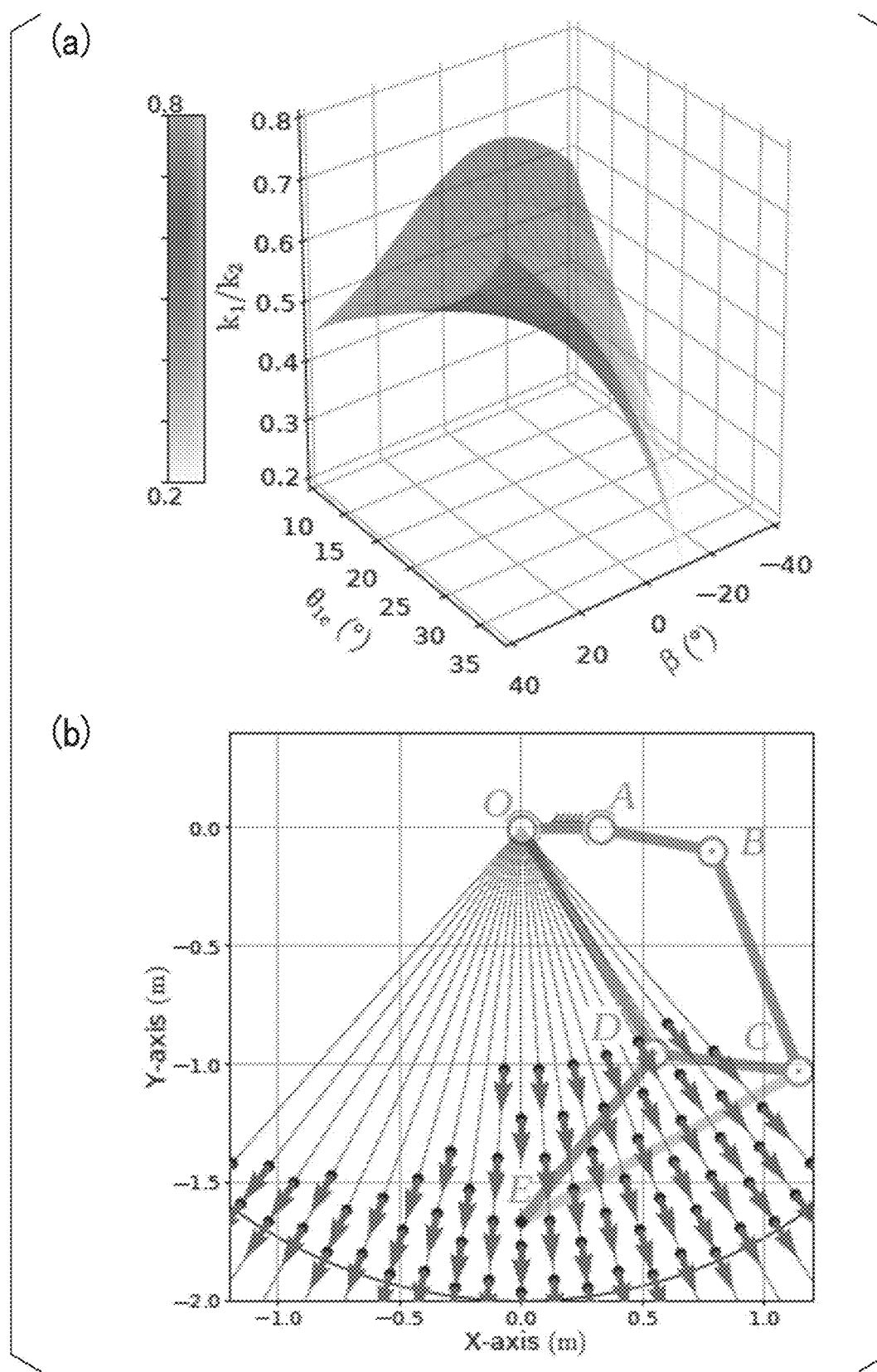
FIG. 5(a) is a graph showing a ratio of spring constants of two springs as a function of an angle of a joint to which the springs are connected in the structure of FIG. 3.
FIG. 5(b) is a graph showing a shape of the structure of FIG. 3 and force acting on the grounding part constituting the structure.

FIG. 5(a) is a graph obtained by substituting the above Formulas (21) and (23) into the above Formula (20) and plotting the ratio of spring constants (k1/k2) as a function of angles θ1c and β. The angle θ1c is a variable corresponding to the length of the line segment OE that connects the first passive joint O and the grounding part E, and the angle β is a variable corresponding to the slope of the line segment OE. As can be seen in the graph, the ratio of spring constants (k1/k2) has non-linearity with respect to the length and slope of the line segment OE.

FIG. 5(b) shows an arrow indicating a force which acts on the grounding part E when the grounding part E is pushed in the OE direction at each position when the positions of the grounding part E are changed in the OE direction by adjusting the angles θ1c and β. At any position, because a force in the direction of the line segment OE acts on the grounding part E, it is understood that the dynamics of the linear motion spring is realized between the first passive joint O and the grounding part E.

When the length Ls of the link DE and the length Lt of the link DO are the same (Ls=Lt), it is preferable because the first term of the right side of the above Formula (24), that is, the right side of the above Formula (23) becomes 1, and the spring to be designed is simplified.

Figure 6:
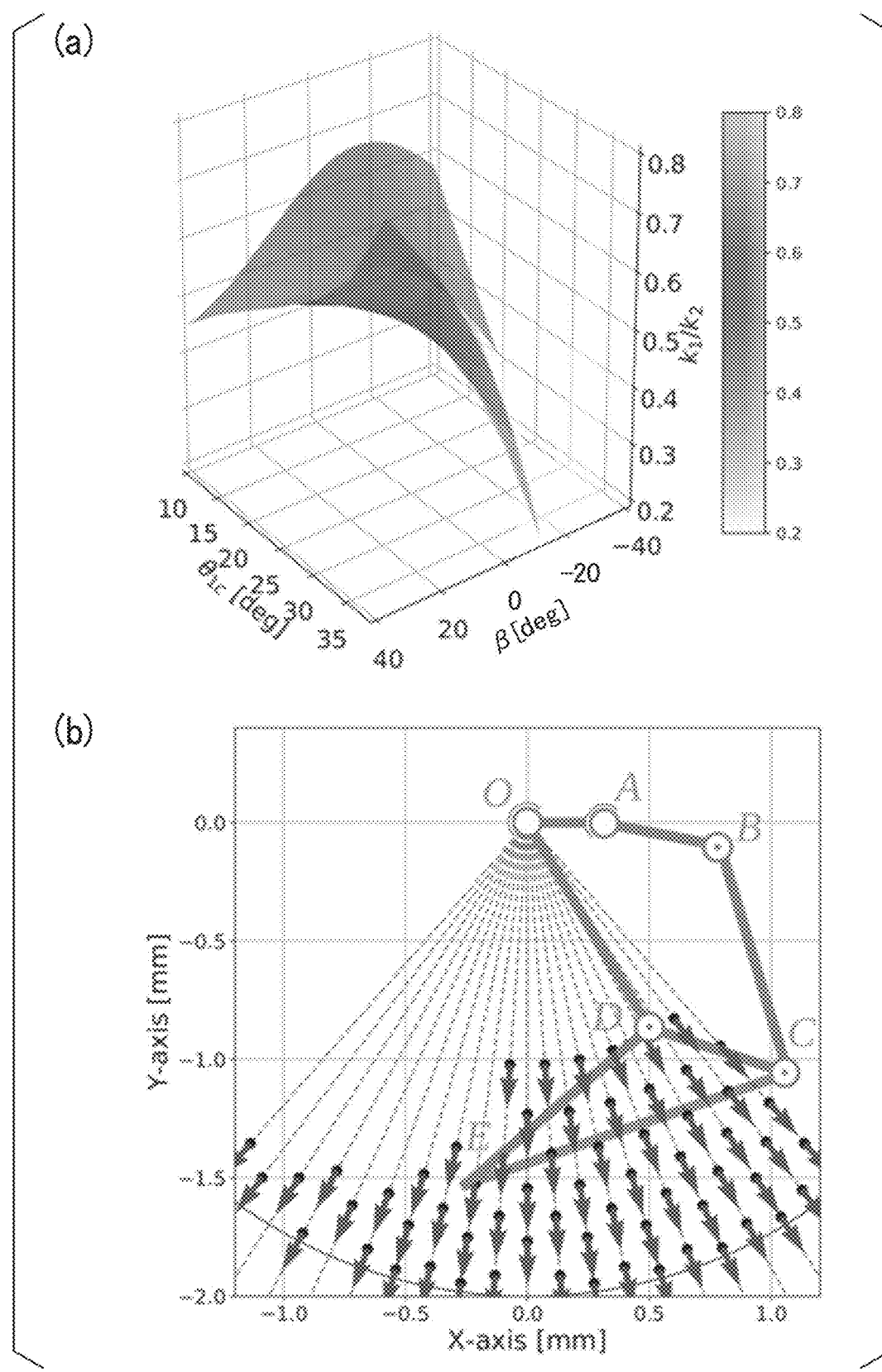
FIG. 6(a) is a graph showing the ratio of the spring constants of two springs as a function of the angle of the joint to which the springs are connected when the structure of FIG. 3 has a more suitable shape.
FIG. 6(b) is a graph which shows the shape of a structure, and the force acting on the grounding part.

FIG. 6(a) is a graph showing the ratio of spring constants (k1/k2) when Ls=Lt as a function of angles θ1c and β. FIG. 6(b) shows an arrow indicating the force which acts on the grounding part E at each position when the positions of the grounding part E are changed in the OE direction by adjusting the angles θ1c and β. It is understood that the results shown in FIGS. 6(a) and 6(b) have the same degree of non-linearity as those in FIGS. 5(a) and 5(b) because the spring to be designed is further simplified.

As described above, the structure 100 according to the present embodiment constitutes the leg 10 having the dynamics of the linear motion spring of the SLIP model by introducing a spring suitable for each parameter of the five-node link, and can realize the movement of the leg 10 that generates a force for expanding and contracting the linear motion spring between the lumbar side portion and the heel side portion. Further, the structure 100 according to the present embodiment is a parallel link type including first passive joints O and A that are in series with each of the two springs, has a high driving force, does not require a controller of a complicated structure that performs fine adjustment of driving when the legs realize dynamics of the linear motion spring of the SLIP model, and if a spring suitable for each parameter can be designed, since the link parameter can be selected arbitrarily, the structure can be miniaturized. Further, the structure 100 according to the present embodiment can simplify the design work of the spring that realizes the linear motion spring of the SLIP model, by making the lengths Ls and Lt of the two links DO and DE connected to the passive joint D constituting the back side portion of the knee equal.

Application Example 4-2

Figure 7:
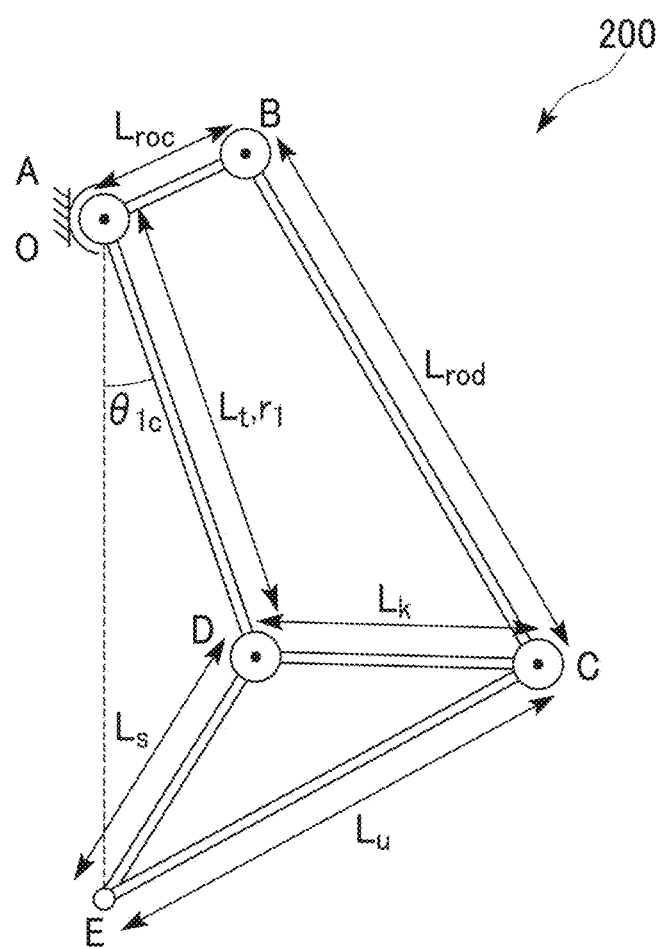
FIG. 7 is a plan view of a structure according to a second embodiment of the present invention.

FIG. 7 is a plan view of a structure 200 shown as Application Example 2 of the design method of the structure according to the above embodiment. In the structure 200, the first passive joint O and the first passive joint A are coaxially connected, and the first passive joint O and the first passive joint A overlap each other in plan view from the axial direction. In the same plan view, L0=0. Further, the length r1 of a line segment AD that connects the first passive joint A and the passive joint D is equal to the length Lt of the link DO (r1=Lt). Other configurations are the same as the configurations of the structure 100 of the first embodiment, and the parts corresponding to the structure 100 are indicated by the same reference numerals regardless of difference in shape.

According to the configuration of the present embodiment, the right side of the above Formula (21) is 1, and the right side of the above Formula (25), that is, the second term of the right side of the above Formula (23) is 0. By substituting these numerical values into the above Formula (20), the ratio of the spring constants (k1/k2) of the present embodiment is described by a simpler function than the ratio of the spring constants (k1/k2) of the first embodiment. That is, the design of the spring becomes easier. The ratio of spring constants (k1/k2) depends only on the angle θ1c, that is, only the length of the line segment OE.

Figure 8:
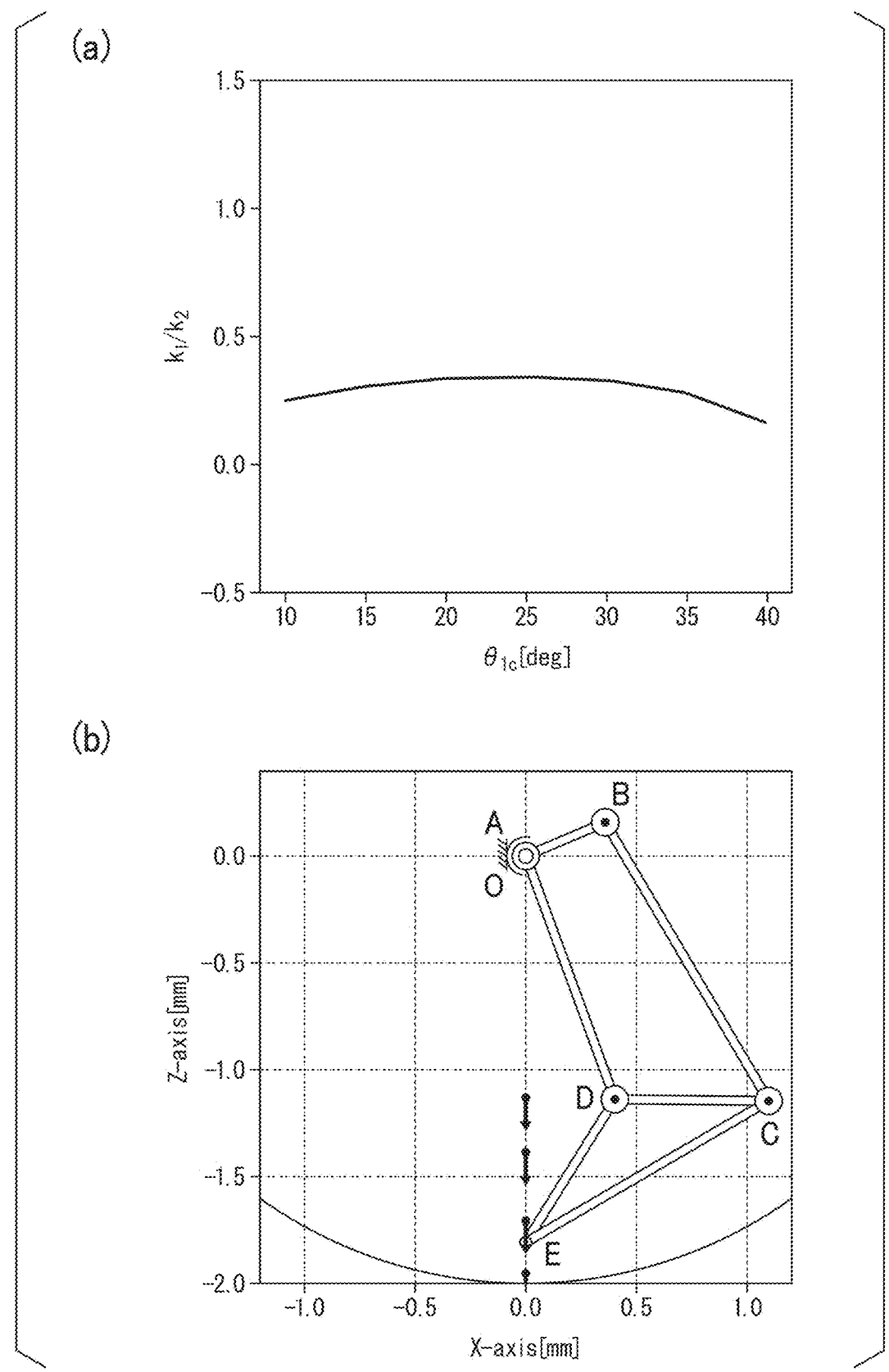
FIG. 8(a) is a graph showing the ratio of the spring constants of two springs in the structure of FIG. 7 as a function of the angle of the joint to which the springs are connected.
FIG. 8(b) is a graph showing the shape of the structure of FIG. 7 and the force acting on the grounding part.

FIG. 8(a) is a graph in which Formulas (21) and (23) are simplified as L0=0 and r1=Lt, and then substituted into the Formula (20) to obtain the ratio of the spring constants (k1/k2) as a function of the angle θ1c. As can be seen in the graph, the ratio of spring constants (k1/k2) has non-linearity with respect to the angle θ1c (the length of the line segment OE).

FIG. 8(b) shows an arrow indicating the force that acts on the grounding part E at each position when the position of the grounding part E is changed in the OE direction by adjusting the angle θ1c. Since the force in the line segment OE direction also acts on the grounding part E at any position, it is understood that the linear motion spring of the SLIP model is realized between the first passive joint O and the grounding part E.

As described above, even in the structure 200 according to the present embodiment, the movement of the linear motion spring of the SLIP model can be realized as in the structure 100 of the first embodiment. Further, since the structure 200 of the present embodiment can be realized by a simpler spring than the structure 100 of the first embodiment, the design work can be further simplified. Further, the structure 200 of the present embodiment is miniaturized (slimmed) by an amount in which the first passive joint O and the first passive joint A overlap in a plan view from the axial direction and is easy to operate in a narrow space. Since the lengths of the link AB and the link CD can be freely set, they may be shortened and further miniaturized or may be lengthened to improve stability.

Application Example 4-3

Figure 9:
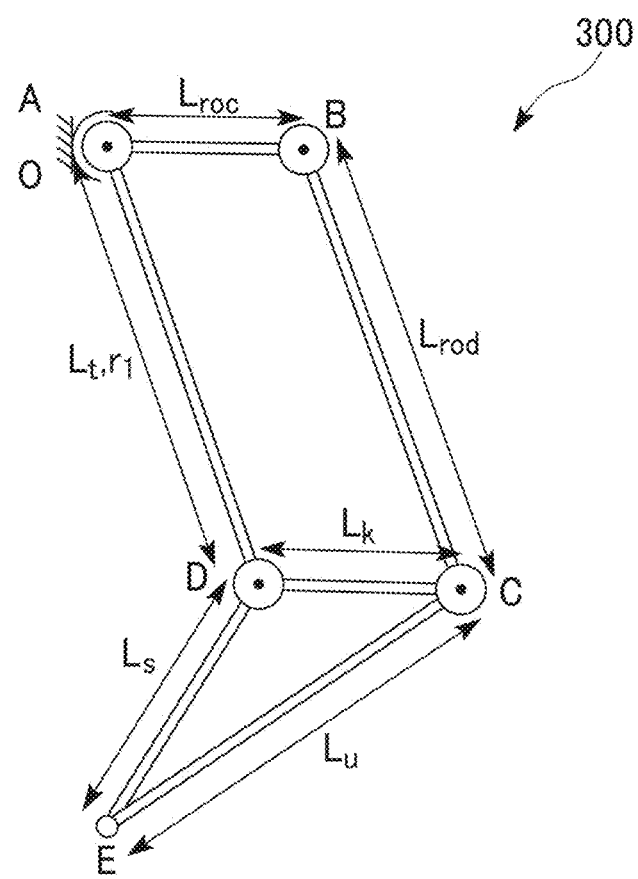
FIG. 9 is a plan view of a structure according to a third embodiment of the present invention.

FIG. 9 is a plan view of a structure 300 shown as Application Example 3 of a design method of a structure according to the above embodiment. In the structure 300, a length r1 of the line segment AD is fixed, a length Lk of the link CD and a length Lroc of the link AB are the same (Lk=Lroc), and a length r1 of the line segment AD and a length Lrod of the link BC is the same (r1=Lrod). In the plan view of the first passive joints O and A from the axial direction, a quadrangle ABCD is a parallelogram. Here, a case where the first passive joint O and the first passive joint A are coaxially connected is shown, but the rotation axis of the first passive joint O and the rotation axis of the first passive joint A may be different from each other. Other configurations are the same as the configurations of the structure 100 of the first embodiment, and the parts corresponding to the structure 100 are indicated by the same reference numerals regardless of the difference in shape.

According to the configuration of the present embodiment, the right side of the above Formulas (25) and (26), that is, the second and third terms of the right side of the above Formula (23) are 0. By substituting these numerical values into the above Formula (20), the ratio of the spring constants (k1/k2) of the present embodiment is controlled by a smaller parameter than the ratio of the spring constants (k1/k2) of the first embodiment. The ratio of spring constants (k1/k2) depends only on the angle θ1c, that is, only the length of the line segment OE.

Figure 10:
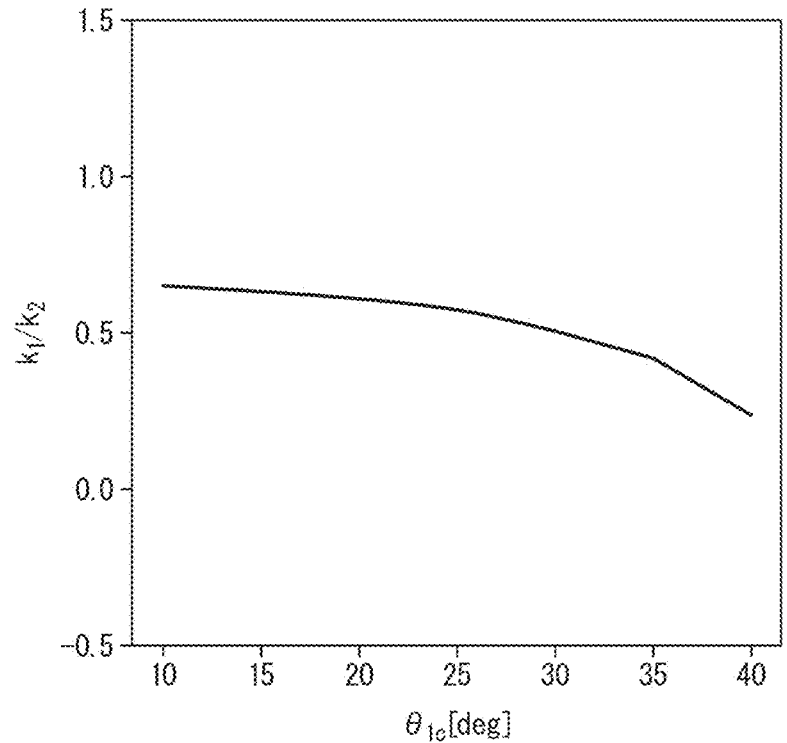
FIG. 10(a) is a graph showing the ratio of spring constants of springs as a function of the angle of the joint to which the spring is connected in the structure of FIG. 9.
FIG. 10(b) is a graph showing the shape of the structure of FIG. 9 and the force acting on the grounding part.
Figure 10:
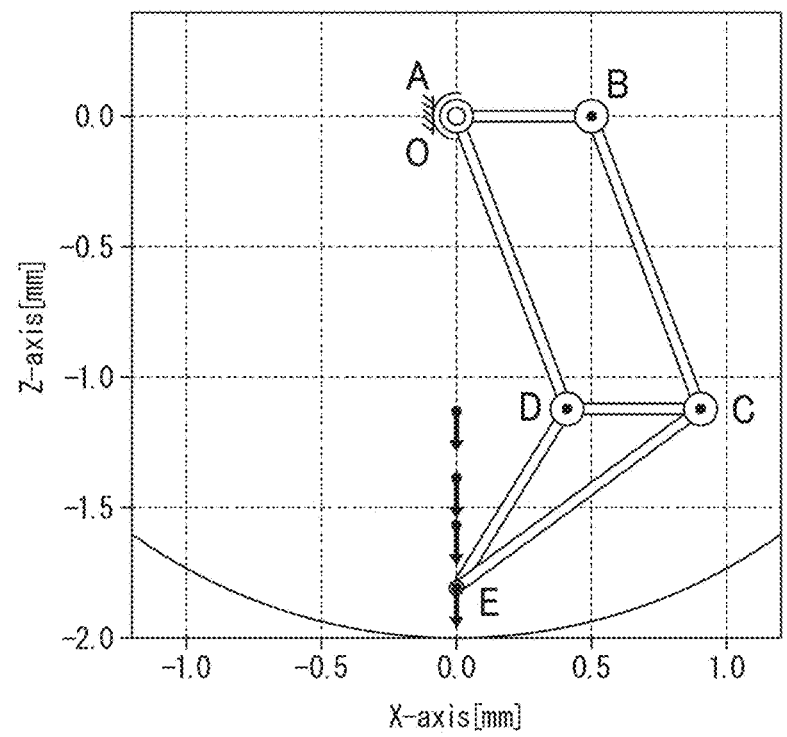

FIG. 10(a) is a graph in which the above Formulas (21) and (23) are simplified as Lk=Lroc and r1=Lrod, and then substituted into the above Formula (20) to obtain the ratio of spring constants (k1/k2) as a function of the angle θ1c. As can be seen from the graph, the ratio of spring constants (k1/k2) has non-linearity with respect to the angle θ1c (the length of the line segment OE).

FIG. 10(b) shows an arrow indicating the force which acts on the grounding part E at each position when the position of the grounding part E is changed in the OE direction by adjusting the angle θ1c. Since the force in the line segment OE direction acts on the grounding part E at any position, it is understood that the linear motion spring of the SLIP model is realized between the first passive joint O and the grounding part E.

As described above, even in the structure 300 according to the present embodiment, the movement of the linear motion spring of the SLIP model can be realized as in the structure 100 of the first embodiment. Further, since the structure 300 of the present embodiment can be realized by a simpler spring than the structure 100 of the first embodiment, the design work can be further simplified.

Application Example 4-4

In the structure according to the fourth embodiment of the present invention, the length of the line segment AD is fixed, the length Lk of the link CD and the length Lrod of the link BC are the same (Lk=Lrod), and the length r1 of the line segment AD and the length Lroc of the link AB are the same (r1=Lroc). In the plan view of the first passive joints O and A from the axial direction, the quadrangle ABCD is a rhombus. Here, a case where the first passive joint O and the first passive joint A are coaxially connected is shown, but the rotation axis of the first passive joint O and the rotation axis of the first passive joint A may be different from each other. Other configurations are the same as the configurations of the structure 100 of the first embodiment, and the parts corresponding to the structure 100 are indicated by the same reference numerals regardless of the difference in shape.

According to the configuration of the present embodiment, the right side of the above Formulas (25) and (26), that is, the second term of the right side of the above Formula (23) is 0, and the third term is a simplified formula. By substituting these numerical values and formulas into the above Formula (20), it is understood that the ratio of the spring constants (k1/k2) of the present embodiment can be controlled with a smaller parameter than the ratio of the spring constants (k1/k2) of the first embodiment. The ratio of spring constants (k1/k2) depends only on the angle θ1c, that is, only the length of the line segment OE.

Although graphing is omitted, the structure according to the present embodiment can also realize the movement of the linear motion spring of the SLIP model as in the structure 100 of the first embodiment. Further, since the structure of the present embodiment can be realized by a simpler spring than the structure 100 of the first embodiment, the design work can be further simplified.

Application Example 4-5

The structure of the present invention may be a combination of the configurations of the first, second, third, and fourth embodiments described above. The structure of the fifth embodiment is a combination of the first, second, and third embodiments, and the length Ls of the link DE and the length Lt of the link DO are equal to each other, and the first passive joint O and the passive joint A are coaxially connected, and the quadrangle ABCD is a parallelogram.

Other configurations are the same as the configurations of the structure 100 of the first embodiment, and the parts corresponding to the structure 100 are indicated by the same reference numerals regardless of the difference in shape.

Figure 11:
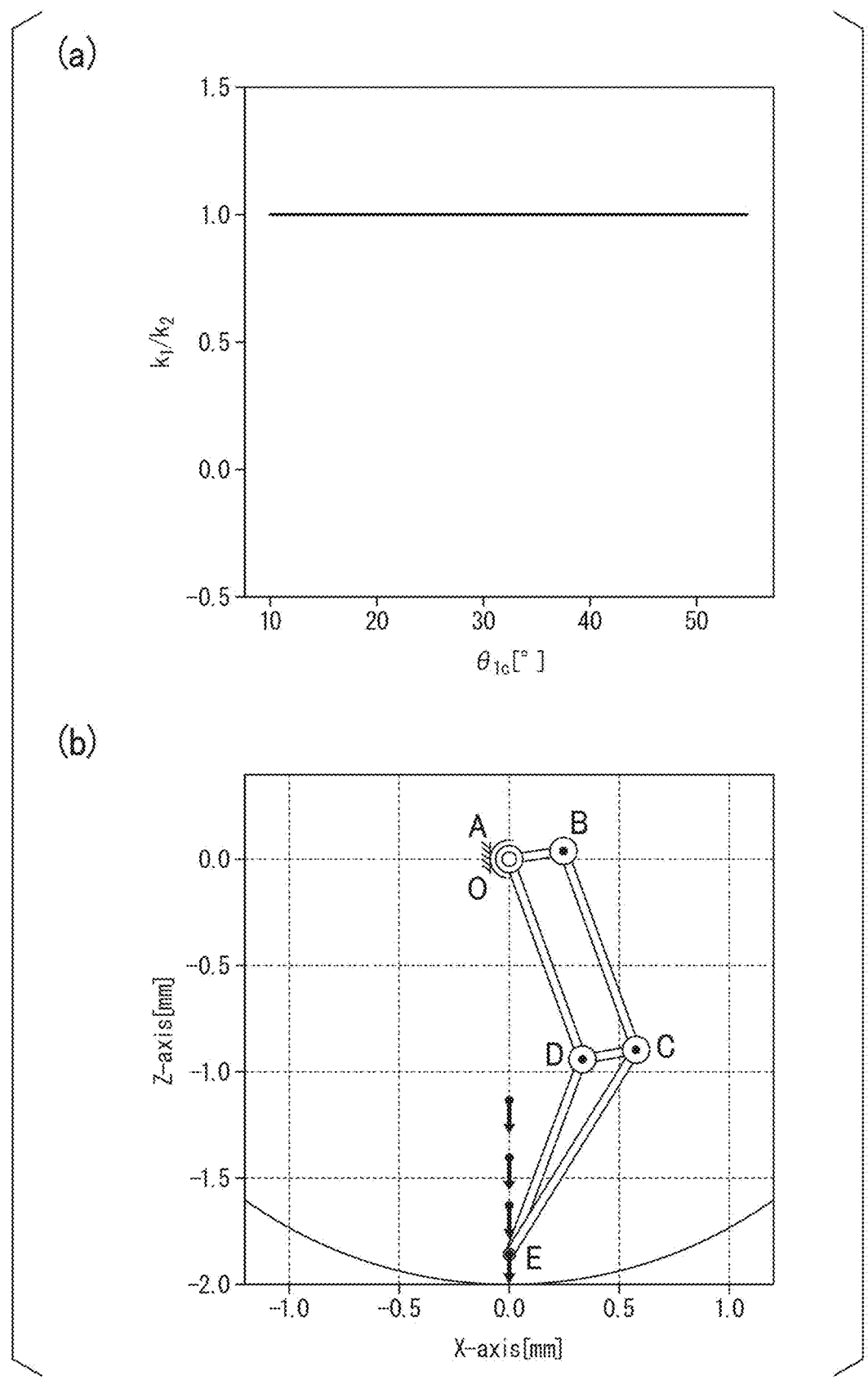
FIG. 11(a) is a graph showing the ratio of spring constants of springs as a function of the angle of the joint to which the spring is connected in a structure according to a fifth embodiment of the present invention.
FIG. 11(b) is a graph which shows the shape of the structure of the fifth embodiment, and the force acting on the grounding part.

FIG. 11(a) is a graph in which the above Formulas (21) and (23) are simplified as Ls=Lt, L0=0, r1=Lt, and Lk=Lroc, r1=Lrod and then substituted into the above Formula (20), and the ratio of the spring constants (k1/k2) is set as a function of the angle θ1c. As can be seen from the graph, the ratio of the spring constants (k1/k2) shows a constant value of 1 regardless of the angle θ1c (the length of the line segment OE), and k1=k2. Therefore, in this embodiment, it is understood that springs O1 and A1 having the same spring constant may be used.

FIG. 11(b) shows an arrow indicating the force that acts on the grounding part E at each position when the position of the grounding part E is changed in the OE direction by adjusting the angle θ1c. Since the force in the line segment OE direction also acts on the grounding part E at any position, the linear motion spring of the SLIP model is realized between the first passive joint O and the grounding part E.

The structure of the above embodiment does not include a link CDE angle (angle formed by CD and DE) a as a design condition, and can select the value arbitrarily. Even in that case, it is possible to realize the linear motion spring of the above SLIP model.

Examples

Hereinafter, the effects of the present invention will be made clearer by the examples. The present invention is not limited to the following examples and can be appropriately modified and implemented without changing the gist thereof.

Figure 12:
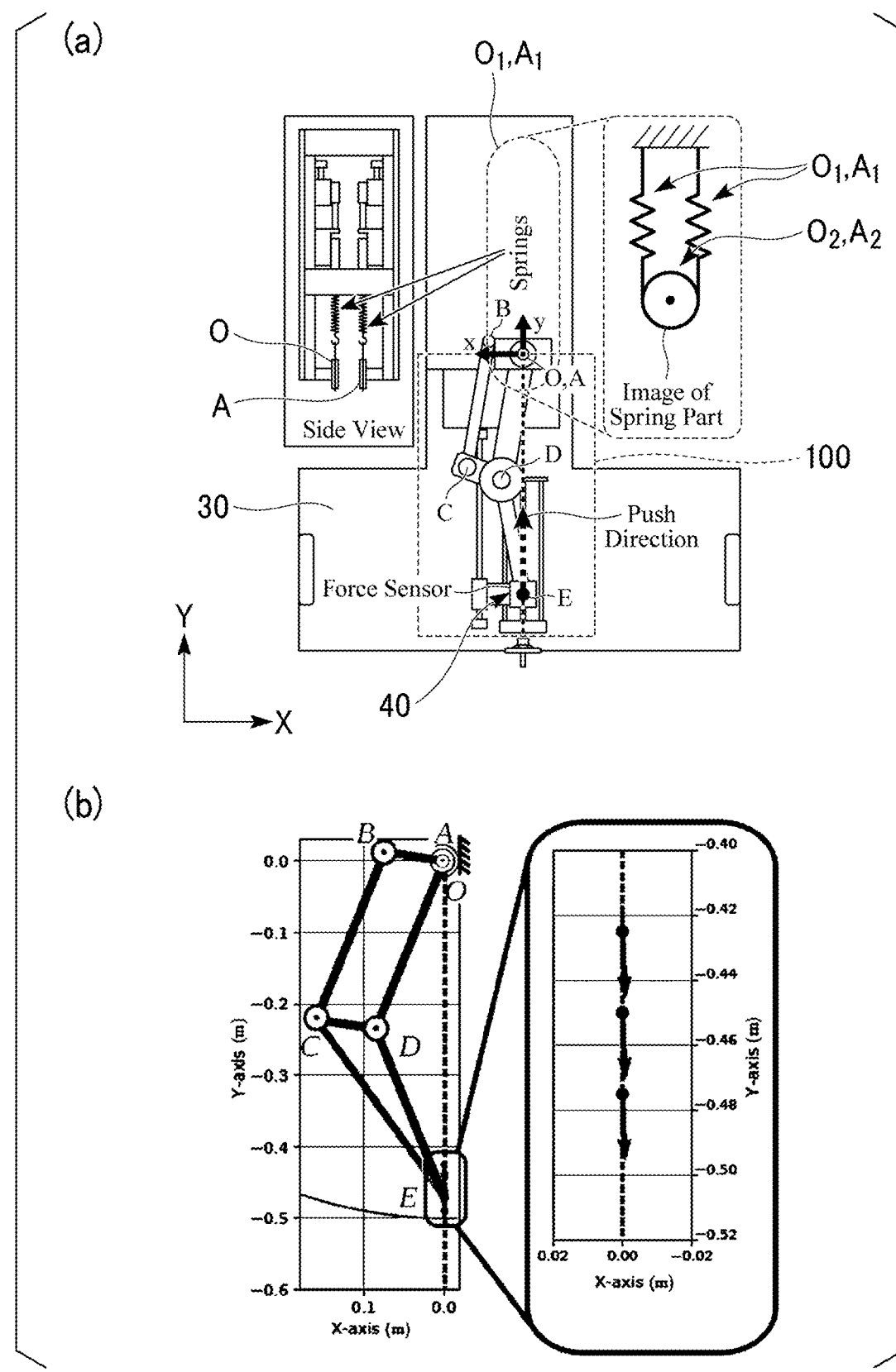
FIG. 12 (a) is a photograph of the structure used as an embodiment of the present invention and a peripheral portion thereof.

The structure 100 according to the above embodiment was produced on the substrate 30, and its operation was checked. FIG. 12(a) is a photograph of the produced structure 100 and its peripheral portion. In the leg 10, the first passive joint O and the first passive joint A are coaxially connected, the link CD and the link DE are integrated, and the link CE is removed. The lengths (Lo, Lroc, Lrod, Lk, Ls, and Lt) of the links OA, AB, BC, CD, DE, and DO was defined as Om, 0.250 m, 0.250 m, 0.250 m, 0.075 m, and 0.075 m in a plan view from the axial direction, respectively. The angle c between the link CD and the link DE was defined as 120°.

The springs O1 and A1 are connected to the core portions of the first passive joints O and A, respectively. Lateral photographs of the first passive joints O and A are placed on an upper left of FIG. 12(a). A schematic diagram of the structure of the first passive joints O and A is placed on an upper right of FIG. 12(a). The spring constants of the two springs O1 and A1 were both defined as 4.9 N/m. A sensor 40 is attached to the grounding part E, and it is possible to detect the force acting on the grounding part E using the sensor 40. A tension of 85N was applied to the two springs O1 and A1, and the force acting on the grounding part E via the five-node link mechanism when rotating the first passive joints O and A was measured.

FIG. 12(b) is a graph showing the measurement results. A relationship between the shape of the structure 100 of a state in which a force is applied and the force acting on the grounding part E is shown in a left graph, and only the force acting on the grounding part E is enlarged and shown in a right graph. From these graphs, the force applied from the first passive joints O and A acts on the grounding part E in the same direction regardless of the position of the grounding part E, and the grounding part E moves on the straight line indicated by a broken line. From this result, it is possible to check that the configuration of the structure 100 of the present invention is equivalent to a configuration in which the first passive joints O and A to which the force is applied and the grounding part E are connected by one spring, and the linear motion spring of the SLIP model is realized.

REFERENCE SIGNS LIST 100, 200, 300 Structure
10 Legs
20 Flat ground
30 Substrate
40 Sensor
O, A First passive joint
O1, A1 Core portion
O2, A2 Spring
k1, k2 Spring constant
τ1, τ2 Torque
f1, f2 Force acting on grounding part
B, C, D Second passive joint
E Grounding part
OA, AB, BC, CD, CE, DE, DO Link

What is claim is:

1. A structure of a leg having a movement mechanism, the structure comprising:
   a plurality of links which link a lumbar side connection part connected to a lumbar part and a grounding part (E) coming into contact with a ground to be walked, and passive joints which link adjacent two of the plurality of links,
   wherein a part of the plurality of the links forms a five-node link mechanism, the part of the plurality of the links consists of
   first passive joints O and A to which a motor having a spring is attached,
   second passive joints B, C, and D to which the motor is not attached,
   the grounding part E,
   a link OA which connects the first passive joint O and the first passive joint A,
   a link AB which connects the first passive joint A and the second passive joint B,
   a link BC which connects the second passive joint B and the second passive joint C,
   a link CD which connects the second passive joint C and the second passive joint D,
   a link CE which connects the second passive joint C and the grounding part E,
   a link DE which connects the second passive joint D and the grounding part E, and
   a link DO which connects the second passive joint D and the first passive joint Q.

2. The structure according to claim 1, wherein a length of the link DE is equal to a length of the link DO.

3. The structure according to claim 1, wherein the first passive joint O and the first passive joint A overlap, and
   a length of a line segment AD which connects the first passive joint A and the second passive joint D is equal to a length of the link DO.

4. The structure according to claim 1, wherein the length of the line segment AD is fixed, the length of the link CD is equal to the length of the link AB, and the length of the line segment AD is equal to the length of the link BC.

5. The structure according to claim 1, wherein the length of the line segment AD is fixed, the length of the link CD is equal to the length of the link BC, and the length of the line segment AD is equal to the length of the link AB.

6. The structure according to claim 1, wherein the link CD, the link CE, and the link DE are integrated.

* * * * *